(12) United States Patent  
Moshayedi et al.

(10) Patent No.: US 7,409,590 B2
(45) Date of Patent: Aug. 5, 2008

(54) PROTECTION AGAINST DATA CORRUPTION DUE TO POWER FAILURE IN SOLID-STATE MEMORY DEVICE

(75) Inventors: Mark Moshayedi, Newport Coast, CA (US); Brian Robinson, San Pedro, CA (US)

(73) Assignee: STEC, Inc., Santa Ana, CA (US)

(*) Notice: Subject to any disclaimer, the term of this patent is extended or adjusted under 35 U.S.C. 154(b) by 0 days.

(21) Appl. No.: 11/494,986

(22) Filed: Jul. 28, 2006

(65) Prior Publication Data

US 2006/0265624 A1 Nov. 23, 2006

Related U.S. Application Data

(63) Continuation of application No. 10/032,332, filed on Dec. 20, 2001, now Pat. No. 7,107,480.

(60) Provisional application No. 60/259,597, filed on Dec. 22, 2000.

(51) Int. Cl.
*G06F 11/00* (2006.01)

(52) U.S. Cl. ...................................................... 714/20
(58) Field of Classification Search .................. 714/13, 714/14, 15, 20, 42
See application file for complete search history.

(56) References Cited

U.S. PATENT DOCUMENTS

| | | | | |
|---|---|---|---|---|
| 5,519,831 | A * | 5/1996 | Holzhammer | 714/22 |
| 5,907,859 | A * | 5/1999 | Shimada et al. | 711/112 |
| 6,336,174 | B1 * | 1/2002 | Li et al. | 711/162 |
| 6,480,933 | B1 * | 11/2002 | Cargemel et al. | 711/113 |
| 6,725,397 | B1 * | 4/2004 | Emberty et al. | 714/24 |
| 7,107,480 | B1 * | 9/2006 | Moshayedi et al. | 714/2 |

* cited by examiner

*Primary Examiner*—Nadeem Iqbal

(57) ABSTRACT

A data preservation system for flash memory systems with a host system, the flash memory system receiving a host system power supply and energizing an auxiliary energy store therewith and communicating with the host system via an interface bus, wherein, upon loss of the host system power supply, the flash memory system actively isolates the connection to the host system power supply and isolates the interface bus and employs the supplemental energy store to continue write operations to flash memory.

20 Claims, 4 Drawing Sheets

PROTECTION AGAINST DATA CORRUPTION DUE TO POWER FAILURE IN SOLID-STATE MEMORY DEVICE

CROSS-REFERENCE TO RELATED APPLICATIONS

This application is a continuation of U.S. patent application Ser. No. 10/032,332 filed Dec. 20, 2001, entitled "SYSTEM AND METHOD FOR PREVENTING DATA CORRUPTION IN SOLID-STATE MEMORY DEVICES AFTER A POWER FAILURE," which is hereby incorporated by reference and which claims the benefit of U.S. Provisional Application No. 60/259,597, filed Dec. 22, 2000, entitled "SYSTEM AND METHOD FOR PREVENTING DATA CORRUPTION IN SOLID-STATE MEMORY DEVICES AFTER A POWER FAILURE", the entirety of which is hereby incorporated herein by reference.

BACKGROUND

1. Field of Invention

The invention relates to saving data and avoiding data corruption in flash memory systems following a power failure and, in particular, to a system and method to actively isolate the flash memory system from a host system and employ an energy storage bank to facilitate storing data to flash memory following the power failure.

2. Description of Related Art

Solid state storage devices, such as Dynamic Random Access Memory (RAM) and Static Random Access Memory (SRAM), have fast access times, require low power, and are generally more durable and compact than magnetic disk drives, but are also more expensive and are volatile, requiring constant power to maintain their memory. As a result, DRAM and SRAM devices are often utilized in electronic systems as temporary memory in addition to non-volatile storage media.

Another type of solid state storage device is a Flash EEPROM device (hereinafter referred to as flash memory). Unlike DRAM and SRAM devices, flash memory systems are non-volatile and retain their memory in the absence of a power source. However, flash memory shares the low power, compactness, and lack of moving parts advantages of solid-state memory and, for this reason, for many applications, flash memory systems are a desirable alternative to conventional magnetic disk drives.

Current flash memory systems typically comprise a processor-based system controller, a data buffer, and an array of flash memory chips especially designed for such a system. The flash memory system typically communicates with and receives system power from a host electronic device, such as a computer, digital camera, etc. An interface bus provides a data conduit between the host and the flash system. The controller directs read and write operations between the flash memory devices and the buffer.

One concern with flash memory systems is that writing data to the flash memory takes some time and it is desirable that, in case of a power failure, incoming data be successfully written to the non-volatile flash memory before the data is lost. One particular hurdle to be overcome is that in case of a power failure other circuit elements, including the host device, can drain power that would otherwise be available to flush the volatile RAM to the non-volatile flash memory. It is also advisable to terminate new incoming data from the host as this data can be readily corrupted by the power failure and it is preferred to not store potentially corrupted data.

SUMMARY OF THE INVENTION

Inventive methods and systems for preserving data in memory systems. In one embodiment, a flash memory system is decoupled from a host system after the detection of a power failure. In another embodiment, an auxiliary energy source is used to complete memory write operations.

In another aspect of the invention, a data preservation system comprises a flash memory system that communicates with a host system. The flash memory system is in communication with a host system power supply that energizes an auxiliary energy store. The flash memory system is also in communication with the host system via an interface bus, wherein, upon loss of the host system power supply, the flash memory system actively isolates the connection to the host system power supply and isolates the interface bus and employs the auxiliary energy store to complete write operations to flash memory.

In another aspect, the invention is a data preservation system for flash memory systems receiving a power supply and experiencing power failure thereof, the data preservation system comprising a detection circuit in communication with the power supply, an auxiliary power source, an isolation circuit isolating the auxiliary power source upon a power failure, and controller circuitry configured to store data in volatile memory into flash memory. In particular aspects, the volatile memory comprises a tri-state buffer, the detection circuit comprises a voltage detector, and/or the auxiliary power source comprises capacitors.

The invention is also a method of preserving data in flash memory systems experiencing a power failure, the method comprising charging an auxiliary power source with a supply voltage, detecting a loss of power of the supply voltage, isolating the auxiliary power source, and utilizing the auxiliary power source to store data stored in volatile memory into flash memory and, in a certain aspect, includes isolating the auxiliary power source comprises opening a relay interconnecting the supply voltage and the auxiliary power source.

Another aspect of the invention is a memory device storing data stored in volatile memory into non-volatile memory wherein, upon loss of power to the memory device, at least one external connection of the device is isolated. In particular aspects the external connection comprises at least one of a connection to a power supply and a connection to a data interface and/or the non-volatile memory comprises a flash chip.

A further aspect of the invention is a method of storing data from volatile memory to non-volatile memory, the method comprising monitoring a power supply and, upon detecting a power failure of the power supply, isolating the non-volatile memory from external connections. One certain aspect includes isolating the non-volatile memory from external connections comprises isolating a power supply connection and a data interface connection.

Yet another aspect of the invention is a data preservation system comprising a power detector, an auxiliary power source, an isolator adapted to isolate the auxiliary power source, and a data store storing data into non-volatile memory powered by the auxiliary power source and in a particular aspect the non-volatile memory comprises a flash card.

The invention further is a method for storing data, the method comprising detecting a power reduction, isolating an auxiliary power source, and storing data into non-volatile memory using the auxiliary power source.

The invention also includes means for preserving data comprising: means for detecting loss of power, means for providing auxiliary power, means for isolating the means for preserving data upon detection of loss of power, and means for storing data in a non-volatile manner.

These and other objects and advantages will become more fully apparent from the following description taken in conjunction with the accompanying drawings. For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Systems and methods for storing data and storing data following a power failure for flash memory systems are disclosed herein. In order to fully specify the preferred designs, various embodiment-specific details are set forth. It should be understood, however, that these details are provided to illustrate embodiments of the invention, and are not intended to limit the scope of the invention.

Figure 1:
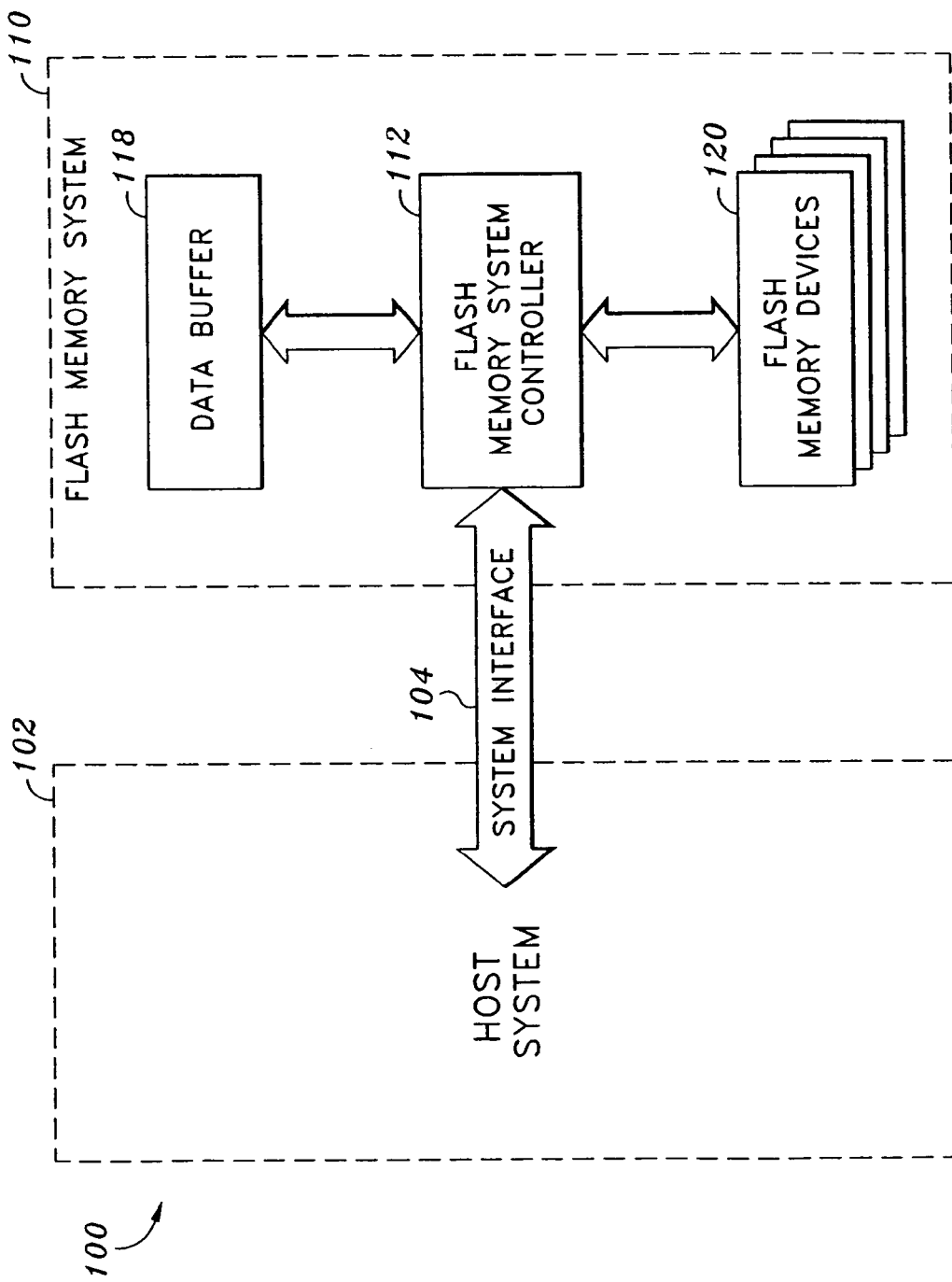
FIG. 1 is a high level block diagram of one embodiment of a host system and a flash memory system.

FIG. 1 illustrates one embodiment of a electronic system 100 comprising a host system 102 and a flash memory system 110 that can implement embodiments of the system and method for storing data disclosed herein. The host system 102 can comprise a computer, digital camera, PDAs, or other electronic devices requiring non-volatile data storage. The flash memory system 110 stores data for the host system 102 in a non-volatile manner, and the two communicate by way of a system interface 104. The host system 102 uses the system interface 104 to deliver commands to the flash memory system 110 to read or write blocks of user data, identifying a specific block of data with an address, and to receive data from the flash memory system 110. The host-provided logical address may be presented in the form of a logical block address, a cylinder-head-sector number, a linear byte address, or some other identifying technology.

On receipt of such a command from the host system 102, a controller 112 in the flash memory system 110 translates the host-provided address into a Valid Flash Device Block Address, or Valid Row Address (VRA). In other embodiments, the controller 112 can comprise controller circuitry, processor circuitry, processors, general purpose single-chip or multi-chip microprocessors, digital signal processors, embedded microprocessors, micro-controllers, and the like. In this embodiment, the controller 112 is resident in the flash memory system 110. In an alternative embodiment, the controller 112 can reside in the host system 102 or alternatively, separately from the host system 102 and the flash memory system 110 and the like.

When the command is a write command, the controller 112 transfers data from the system interface 104 into an intermediate data buffer 118, and from the data buffer 118 to a storage location that corresponds to the received VRA, the location being in an array of one or more flash memory devices 120.

When the command is a read command, the controller 112 orchestrates a transfer of data from one or more locations in the array of flash memory devices 120 that correspond to the host-provided address received via the system interface 104. The controller 112 transfers the data from the memory array 120 into the intermediate data buffer 118, and thence from the data buffer 118 to the host system 102, again by way of the system interface 104.

In the embodiment illustrated in FIG. 1, the flash memory devices 120 are provided in an array of flash memory devices or chips. However, the flash memory 120 can also be implemented on an individual chip, device, or other component, or on a plurality or variety of such chips, devices, or other components in alternative embodiments of the invention.

Figure 2:
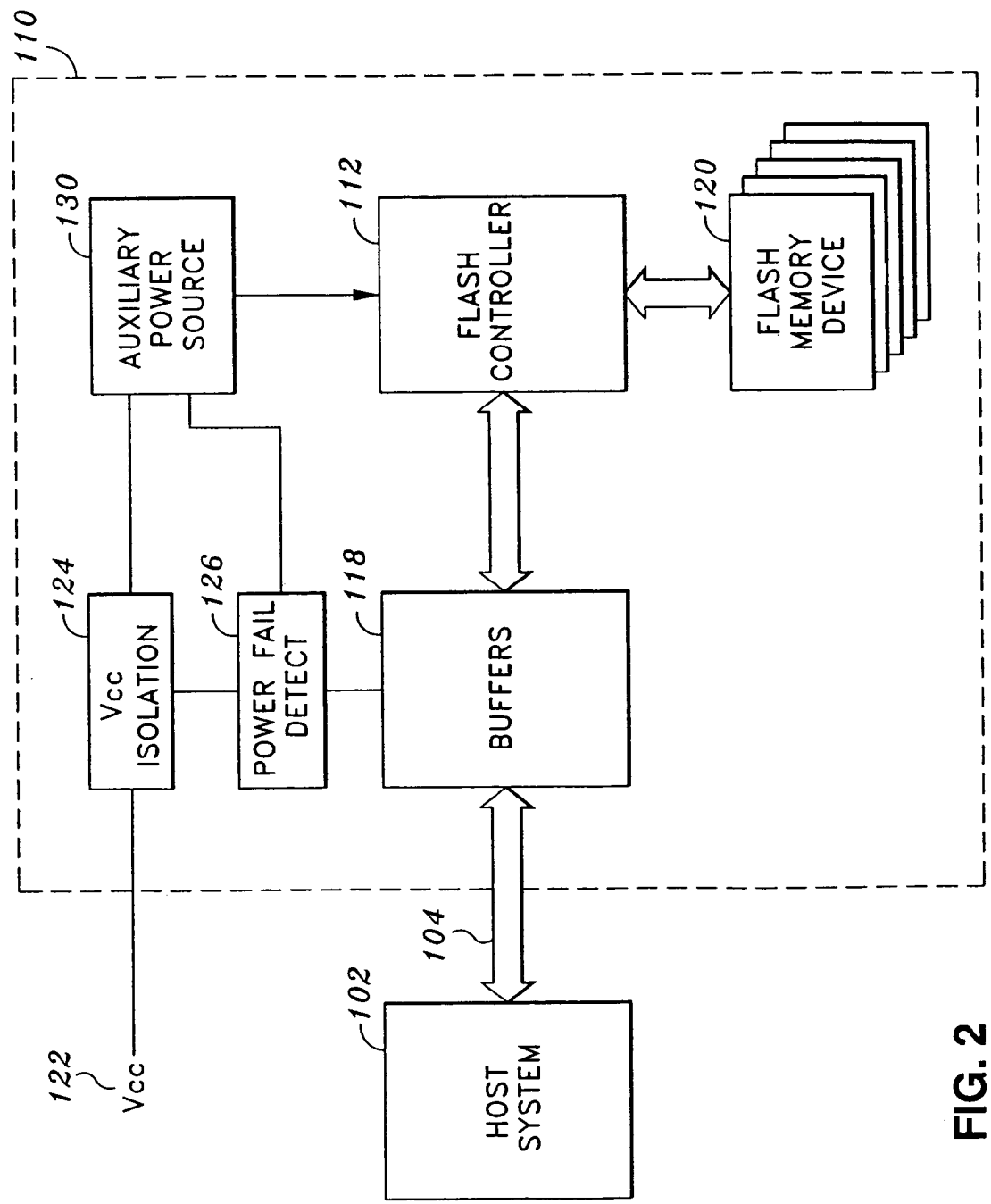
FIG. 2 is high level block diagram of one embodiment of a data preservation system for a flash memory system.

FIG. 2 is a functional block diagram of one embodiment of the invention illustrating the general system architecture in greater detail. In this embodiment, the flash memory system 110 receives a supply voltage, $V_{cc}$ 122. $V_{cc}$ 122, in this embodiment, is provided by the host system 102 and during normal operation is continuously available to the flash memory system 110. In an alternative embodiment, $V_{cc}$ 122 can be provided by other power sources separate from the host system 102.

In the event of failure to maintain $V_{cc}$ 122 such as when the host system 102 loses power, or when the flash memory system 110 is disconnected from $V_{cc}$ 122, The flash memory system 110 is adapted to detect the loss of power. In one embodiment, the flash memory system 110 isolates the flash memory system 110 from $V_{cc}$ 122 and the host system 102, and stores data to the flash memory devices 120 in a manner that will be described in greater detail below.

The flash memory system 110 comprises a supply voltage $V_{cc}$ isolator 124. The $V_{cc}$ isolator 124, in this embodiment, is a circuit that can actively sever the connection between $V_{cc}$ 122 and the flash memory system 110 to avoid the host system 102 acting as a load on the flash memory system 110. The flash memory system 110 also comprises a power failure detector 126 that can detect the loss of $V_{cc}$ 122 from the flash memory system 110. In this embodiment, the power failure detector 126 directs the $V_{cc}$ isolator 124 to sever the connection to $V_{cc}$ 122 and terminate pending flash memory system write operations if the power failure detector 126 detects the loss of $V_{cc}$ 122.

The flash memory system 110 also comprises an auxiliary power source 130 that, during normal operation, receives $V_{cc}$ 122 via the $V_{cc}$ isolator 124. In case of loss of $V_{cc}$ 122, the auxiliary power source 130 is actively isolated from the host system 102 and provides temporary operating power to the flash memory system 110 to continue pending write operations in a manner that will be described in greater detail below so as to avoid data corruption.

Figure 3:
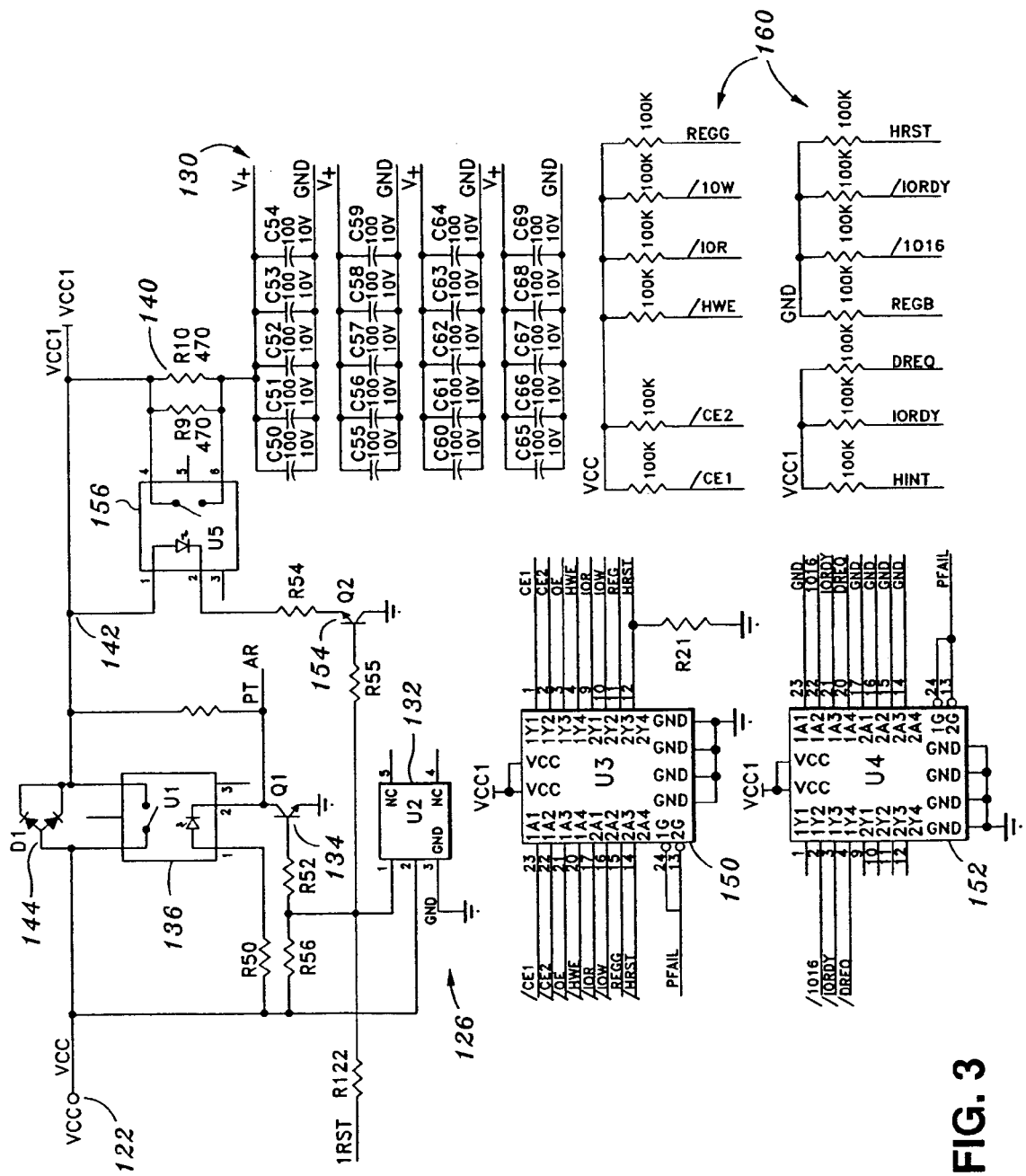
FIG. 3 is a circuit schematic of one embodiment of a data preservation system for flash memory systems after a power failure.

FIG. 3 is a schematic of one embodiment of the invention and shows a circuit performing the functional aspects of the invention as shown in FIG. 2 in greater detail. As shown in FIG. 3, the flash memory system 110 receives a supply voltage, $V_{cc}$ 122, in this embodiment from the host system 102. $V_{cc}$ 122 is provided to the power failure detector 126, which in this embodiment comprises a voltage detector U2 132. The voltage detector 132 normally holds a signal line /OUT on pin 1 high. The /OUT signal is connected via a 4.7 kΩ resistor to the base of a transistor Q1 134, causing transistor 134 to conduct. The conduction of transistor 134 causes a relay U1

136 to close. Relay 136, in a closed condition, passes $V_{cc}$ 122 to an auxiliary supply node 142 and, via a resistor 140, to the auxiliary power source 130. In this embodiment, the auxiliary power source 130 comprises a bank of 20 capacitors connected in parallel.

The collector of the transistor 134 is connected via a 10 kΩ resistor to the auxiliary supply node 142. The auxiliary supply node 142 is also connected via a normally forward biased diode 144 to the supply voltage, $V_{cc}$ 122. The collector node of transistor 134 defines a power fail signal 146 which is normally low. The power fail signal 146 is provided to inverted chip enable pins of two buffers U3 150 and U4 152. The buffers 150, 152 are connected to the host system 102 via the system interface 104 and store data as is it exchanged between the host system 102 and the flash memory system 110.

The /OUT signal is also connected via a 4.7 kΩ resistor to the base of a transistor Q2 154. The emitter of the transistor 154 is connected via a 470 Ω to a relay U5 156 and then to the auxiliary supply node 142. The transistor 154 is normally off and relay 156 is normally open.

If the voltage detector 132 detects a loss of $V_{cc}$ 122 on pin 2, the voltage detector 132 lowers the /OUT signal which causes transistor 134 to stop conducting and the power fail signal 146 to go high. This causes relay 136 to open which actively severs the connection to the supply voltage $V_{cc}$ 122 and isolates the auxiliary supply node 142 from the supply voltage $V_{cc}$ 122 via the now reverse biased diode 144. Transistor 154 starts conducting which causes relay 156 to close thereby shorting across the resistor 140 and providing the charge of the auxiliary power supply 130 directly to the auxiliary supply node 142.

The power fail signal 146 going high causes the buffers 118 comprising, in this embodiment, buffers 150 and 152 to stop conducting. The buffers 150, 152 tri-state and a plurality of terminating resistors 160 terminate the inputs of the buffers 150, 152 to inhibit open circuits which would other wise result if the flash memory system 110 is physically separated from the host system 102. Terminating the activity of the buffers 150, 152 inhibits the flash memory system 110 from storing data that the buffers 150, 152 may receive from the host system 102 that may be corrupted by the power failure.

Isolating the auxiliary power supply 130 from the host system 102 enables the charge of the auxiliary power supply 130 to be available for completing any write operations that the flash memory system 110 was conducting when the power failure occurred without also attempting to maintain power to other circuits in the host system 102 or others that are normally supplied with the supply voltage $V_{cc}$ 122. This aspect of the invention also facilitates updating any File Access Tables (FAT) or other data organization information such that stored data can be more readily read and accessed when normal operation of the electronic system 100 returns.

Figure 4:
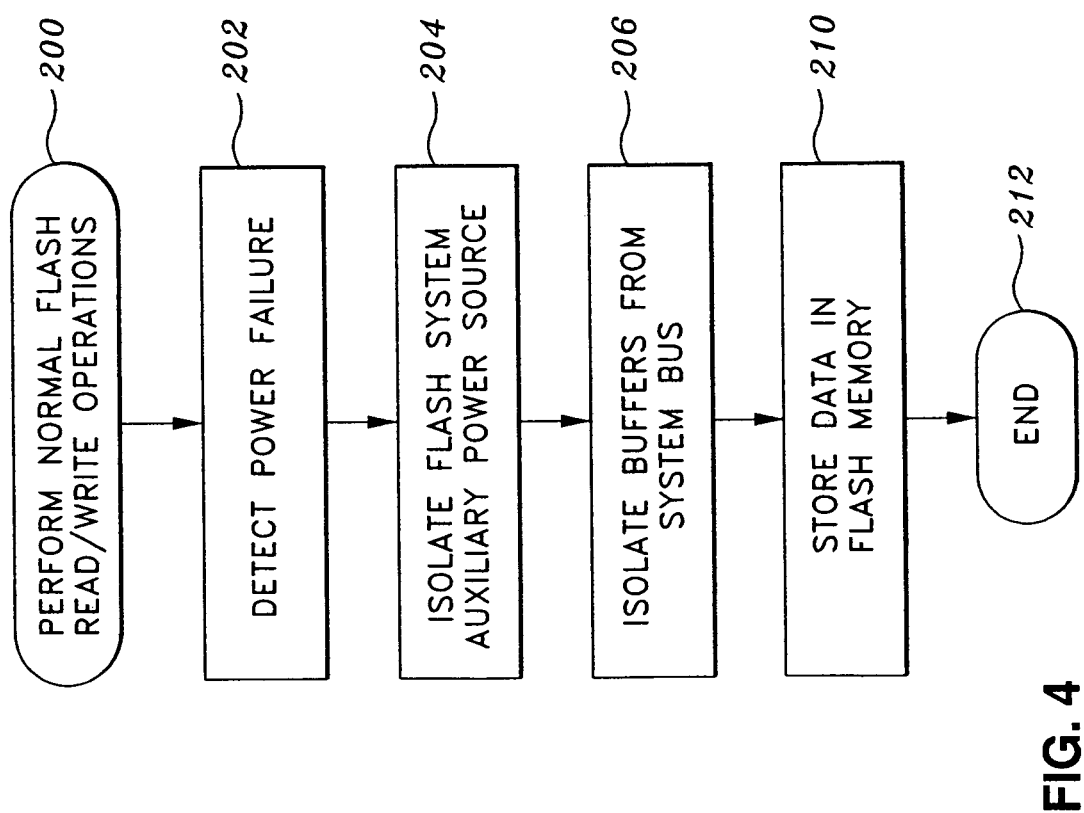
FIG. 4 is a flow chart of one embodiment of a method of preserving data in a flash memory system after a power failure

FIG. 4 is a functional flow chart indicating the operation of one embodiment of the invention. State 200 indicates normal operation of the flash memory system 110 with the host system 102 wherein power is provided normally to the flash memory system 110 and the auxiliary power source 130 is charged, but not used. State 202 indicates detection of a power failure by the flash memory system 110. As previously described, state 202 indicates that the normally supplied voltage has dropped below a predetermined threshold or is otherwise no longer available to the flash memory system 110.

State 204 follows upon the occurrence of state 202 and indicates the isolation of the auxiliary power source 130. State 206 also follows the occurrence of state 202 and indicates the isolation of the buffers 118 from the host system 102. This aspect of the invention inhibits storing data that may be received in the buffers 118 that may be corrupted by the loss of power from being stored.

State 210 indicates storing the data in flash memory. State 210 comprises otherwise normal storage of data to the flash memory devices 120 as directed by the flash controller 112, except that after a power failure, the flash controller 112 and the flash memory devices 120 receive operational power from the auxiliary power source 130 as previously described. State 212 is an end state wherein normal supply voltage is again supplied to the flash memory system 110 and normal operation resumes or the auxiliary power source 130 is depleted after the data is stored to the flash memory devices 120 in state 210. Although FIG. 4 indicates a sequential flow, is should be understood by one of skill in the art that the operations described for states 202, 204, 206, and 210 can occur partially or substantially in parallel.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data storage system receiving a power supply and experiencing a power reduction thereof, the data storage system comprising:
   a detection circuit coupled with the power supply;
   an auxiliary power source;
   a flash memory for storing data;
   an isolation circuit for isolating parts of the data storage system upon the detection of the power reduction by the detection circuit, wherein the power reduction is a condition where voltage of the power supply has dropped below a predetermined threshold; and
   a controller configured to complete pending flash memory operations storing data into the flash memory using the auxiliary power source.

2. The data storage system of claim 1, wherein the detection circuit comprises a voltage detector.

3. The data storage system of claim 1, further comprising an interface for receiving write operations from a host system, wherein the isolation circuit is configured to inhibit the interface from accepting write operations from the host system upon detection of the power reduction by the detection circuit.

4. The data storage system of claim 1, further comprising a buffer for storing data prior to storage in the flash memory, wherein the isolation circuit is configured to inhibit the buffer from accepting additional data upon detection of the power reduction by the detection circuit.

5. The data storage system of claim 1, wherein the data storage system comprises a flash card.

6. The data storage system of claim 1, wherein the auxiliary power source comprises a capacitive device.

7. The data storage system of claim 1, wherein the auxiliary power source comprises a super capacitor.

8. The data storage system of claim 1, wherein the controller is further configured to update data organization information relating to the flash memory.

9. A method of storing data in a data storage system experiencing a power reduction in a power supply, the data storage system comprising a volatile memory and a flash memory, the method comprising:

provurred an auxiliary power source;

detecting the power reduction, wherein the power reduction is a condition where voltage of the power supply has dropped below a predetermined threshold;

isolating parts of the data storage system upon detection of the power reduction; and utilizing the auxiliary power source to complete pending flash memory operations storing data into the flash memory.

10. The method of claim 9, wherein the step of detecting the power reduction is performed by a voltage detector.

11. The method of claim 9, wherein the data storage system further comprises an interface for receiving write operations from a host system, and wherein the step of isolating parts of the data storage system comprises inhibiting the interface from accepting write operations from the host system.

12. The method of claim 9, wherein the volatile memory comprises a buffer for storing data prior to storage in the flash memory, and wherein the step of isolating parts of the data storage system comprises inhibiting the buffer from accepting additional data.

13. The method of claim 9, wherein the data storage system comprises a flash card.

14. The method of claim 9, wherein the auxiliary power source comprises a capacitive device.

15. The method of claim 9, wherein the auxiliary power source comprises a super capacitor.

16. The method of claim 9, wherein the power reduction is a complete loss of power.

17. The method of claim 9, further comprising updating data organization information relating to the flash memory.

18. The method of claim 9, further comprising charging the auxiliary power source using a power supply.

19. A data storage system receiving a power supply and experiencing a power reduction thereof, the data storage system comprising:

means for detecting the power reduction, wherein the power reduction is a condition where voltage of the power supply has dropped below a predetermined threshold;

means for nroviding an auxiliary power source;

means for storing data in a flash memory;

means for isolating parts of the data storage system upon the detection of the power reduction; and means for completing pending flash memory operations storing data into the flash memory using the auxiliary power source.

20. The data storage system of claim 1, wherein the power supply is further configured to charge the auxiliary power source.

* * * * *